United States Patent Office 2,774,768
Patented Dec. 18, 1956

2,774,768
PROCESS OF PREPARING BASIC KETONES

Gustav Ehrhart, Bad Soden am Taunus, Karl Schmitt, Frankfurt am Main, and Heinrich Ott, Eppstein (Taunus), Germany, assignors to Farbwerke Hoechst Aktiengesellschaft vormals Meister Lucius & Bruning, Frankfurt am Main, Germany, a corporation of Germany No Drawing. Application April 26, 1955,
Serial No. 504,094

Claims priority, application Germany May 3, 1954

5 Claims. (Cl. 260—296)

The present invention relates to a process of preparing basic ketones; more particularly it relates to a process of preparing basic ketones corresponding to the general formula:

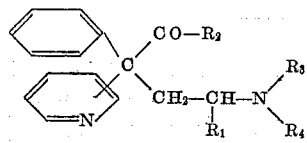

wherein $R_1$ represents a hydrogen atom or a methyl group, $R_2$ an alkyl radical having at most 4 carbon atoms, and $R_3$ and $R_4$ each represents an alkyl radical having at most 3 carbon atoms or taken together with the nitrogen atom form a saturated heterocyclic ring system. The compounds corresponding to the above given formula constitute valuable medicaments and possess an excellent analgesic effect.

Now we have found that basic ketones of the kind described above can be prepared by a simple and smooth reaction by reacting compounds of the general formula:

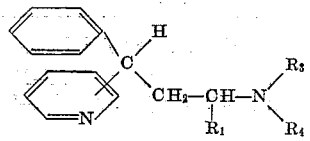

wherein the substituents $R_1$, $R_3$ and $R_4$ have the meanings given in the first formula, with alkali metal hydrides, alkali metal amides or alkali metal compounds of hydrocarbons, condensing the alkali metal compounds so obtained with an ester or a halide of a lower aliphatic carboxylic acid, the alcohol component of the said ester containing at most 3 carbon atoms.

As starting materials suitable for the process of this invention there can be used compounds corresponding to the general formula given above, wherein the individual radicals may have the following meanings: $R_1$:hydrogen or methyl, $R_3$ and $R_4$:methyl, ethyl and propyl; the two substituents $R_3$ and $R_4$ taken together with the nitrogen atom may also represent a saturated heterocyclic ring system, for example, a pyrrolidino, piperidino, morpholino or a piperazino grouping.

The following compounds may be especially named: 1-phenyl-1-pyridyl-(2')-3-dimethylamino-propane, 1-phenyl-1-pyridyl-(4')-3-diethylaminopropane, 1-phenyl-1-pyridyl-(2')-3-dimethylamino-butane, 1-phenyl-1-pyridyl-(4')-3-morpholino-propane, 1-phenyl-1-pyridyl-(2')-3-piperidino-propane and 1-para-chlorophenyl-pyridyl-(2')-3-pyrrolidino-butane.

The reaction is conducted with the aid of strongly basic condensing agents. As condensing agents of this kind there may be mentioned, for example: alkali metal compounds of hydrocarbons, such as phenyl sodium, phenyl lithium, butyl lithium, alkali metal amides, for example, sodamide, potassium amide or alkali metal hydrides, such as sodium hydride or lithium hydride. In case alkali metal compounds of hydrocarbons are used as condensing agents, they need not be added in substance. They may also be produced in the reaction mixture in which they intermediarily appear; thus, for example, the sodium compound of the substituted propane is directly formed when a mixture of 1-phenyl-1-pyridyl-3-dimethylamino-propane and chlorobenzene is added dropwise to a suspension of finely dispersed sodium in ether.

As esters there are advantageously used those esters which are derived from lower carboxylic acids and alcohols containing at most 3 carbon atoms, for example, acetic methyl ester, propionic ethyl ester and isobutyric methyl ester. As acid chlorides there come into consideration, for example, acetyl chloride, propionyl chloride and isobutyric chloride.

When performing the reaction, it is advantageous first to transform the basic compounds concerned in an indifferent solvent, for example, ether or aromatic hydrocarbons, such as benzene, toluene or xylene, into the corresponding alkali metal compounds with the aid of strongly basic condensing agents.

Carboxylic esters or carboxylic chlorides, which may be added in an undiluted form or in admixture with an indifferent solvent, are then caused to act upon the solutions or suspensions of the alkali metal compounds formed. The reaction may be conducted at a low or at a slightly raised temperature—the heat of reaction being decreased by cooling, if desired—and it may subsequently be completed by heating.

As compared with the known processes, the process of this invention is distinguished by a smooth reaction yielding basic ketones in shorter time and with less expenditure of energy.

The ketones, especially the ethyl ketones, obtainable according to this invention may, for example, be used as excellent pain or cough-stilling pharmaceuticals. Their analgesic effect partly equals and—with regard to their tolerability—excels that of 2-dimethylamino-4.4-diphenyl-heptanone-(5)-hydrochloride.

The following examples serve to illustrate the invention, but they are not intended to limit it thereto, the parts being by weight unless otherwise stated and the relationship of parts by weight to parts by volume being the same as that of the kilogram to the liter:

Example 1

A suspension of 5.5 parts of finely dispersed sodium in 100 parts by volume of ether is added dropwise to a mixture of 24 parts of 1 - phenyl - 1 - pyridyl - (2')-3-dimethylamino-propane and 12.8 parts of chlorobenzene and the reaction mixture is stirred until the heat of reaction has decreased. The red-brown reaction mixture is then heated to boiling for a further 1 hour. After cooling, 12.3 parts of propionic ethyl ester are added dropwise to the reaction mixture so obtained, a vigorous reaction taking place; finally the reaction mixture is heated to boiling for a further 15 minutes. The reaction mixture is then mixed with water, while cooling with ice, the organic layer is isolated, washed with water, dried with sodium sulfate and then evaporated. By distillation of the residue so obtained, 1-dimethylamino-3-phenyl-3-pyridyl-(2')-hexanone-(4) is obtained boiling at 165–170° C. under a pressure of 2 mm. of mercury. The corresponding maleate melts at 142–143° C.

Example 2

A mixture consisting of 48 parts of 1-phenyl-1-pyridyl-(4') - 3 - dimethylamino-propane, 200 parts of volume of toluene and 9 parts of pulverised sodamide is heated to boiling, while passing nitrogen through the mixture, until the evolution of ammonia has practically ceased. A solution of 40.7 parts of propionyl chloride in 50 parts by volume of toluene is then added dropwise, while stirring and cooling with ice, and the reaction mixture so obtained is heated for 30 minutes at 95° C. After cooling, water and an excess of dilute hydrochloric acid are added, while cooling with ice, the organic layer is isolated and shaken with dilute hydrochloric acid. The combined hydrochloric acid solutions are clarified by treating them with activated carbon and rendered alkaline, and the oil which has separated is taken up in ether. The etherea solution is dried with sodium sulfate, evaporated and the residue formed is fractionated under reduced pressure. By distillation 1 - dimethylamino - 3 - phenyl - 3 - pyridyl-(4')-hexanone-(4) is obtained in the form of a very viscous orange colored oil boiling at 152–156° C. under a pressure of 0.3 mm. of mercury. The corresponding maleate melts at 132° C.

We claim:

1. The process of preparing basic ketones corresponding to the general formula:

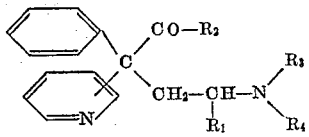

wherein $R_1$ represents a member of the group consisting of hydrogen and methyl, $R_2$ represents an alkyl radical having at most 4 carbon atoms, and $R_3$ and $R_4$ represent alkyl radicals having at most 3 carbon atoms and taken together with —N< form a saturated heterocyclic ring system, which comprises reacting compounds of the general formula:

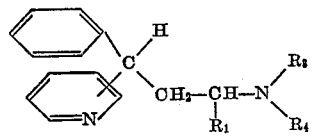

wherein $R_1$, $R_3$ and $R_4$ have the meanings given above, with a member selected from the group consisting of alkali metal amides, alkali metal hydrides and alkali metal compounds of hydrocarbons in the presence of an indifferent solvent, completing the reaction by heating and adding to the reaction mixture, without isolation of the alkali metal compound formed, a member of the group consisting of esters and halides of lower aliphatic carboxylic acids, the alcohol components of the said esters containing at most 3 carbon atoms.

2. The process as claimed in claim 1, wherein compounds of the general formula:

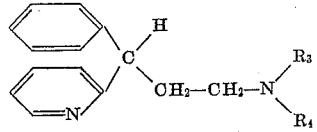

wherein $R_3$ and $R_4$ represent alkyl radicals having at most 3 carbon atoms, are used as starting material.

3. The process as claimed in claim 1, wherein compounds of the general formula:

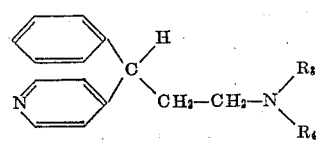

wherein $R_3$ and $R_4$ represent alkyl radicals having at most 3 carbon atoms, are used as starting material.

4. The process as claimed in claim 1, wherein the alkali metal compounds are condensed with the propionic ethyl ester.

5. The process as claimed in claim 1, wherein the alkali metal compounds are condensed with propionyl chloride.

References Cited in the file of this patent

UNITED STATES PATENTS 2,676,964     Sperber et al.  ---------- Apr. 27, 1954

FOREIGN PATENTS 698,201     Great Britain ------------ Oct. 7, 1953

OTHER REFERENCES

Yost et al.: JACS (1947), pp. 2325–28, vol. 69.
Morton et al.: JACS (1949), pp. 481–86, vol. 71.